United States Patent
Chen et al.

(10) Patent No.: US 8,393,010 B2
(45) Date of Patent: Mar. 5, 2013

(54) NEAR-FIELD SCANNING OPTICAL MICROSCOPE

(75) Inventors: Chih-Wen Chen, Keelung (TW); Jyh-Rou Sze, Hsinchu (TW); Din-Ping Tsai, Taipei (TW); Fong-Zhi Chen, Hsinchu (TW)

(73) Assignee: National Applied Research Laboratories, Taipei (TW)

( * ) Notice: Subject to any disclaimer, the term of this patent is extended or adjusted under 35 U.S.C. 154(b) by 117 days.

(21) Appl. No.: 13/015,701

(22) Filed: Jan. 28, 2011

(65) Prior Publication Data

US 2012/0159677 A1    Jun. 21, 2012

(30) Foreign Application Priority Data

Dec. 15, 2010   (TW) ............................ 99144078 A

(51) Int. Cl.
*G01Q 60/18* (2010.01)
*G01Q 20/02* (2010.01)
(52) U.S. Cl. .............................................. 850/6; 850/30
(58) Field of Classification Search .......... 850/6, 30–32; 356/301
See application file for complete search history.

(56) References Cited

U.S. PATENT DOCUMENTS

| | | | | |
|---|---|---|---|---|
| 2001/0048068 | A1* | 12/2001 | Narita et al. | 250/216 |
| 2002/0114567 | A1* | 8/2002 | Novotny et al. | 385/33 |
| 2002/0145732 | A1* | 10/2002 | Vaez-Iravani et al. | 356/237.2 |
| 2006/0131493 | A1* | 6/2006 | Narita et al. | 250/234 |
| 2009/0059236 | A1* | 3/2009 | Meeks et al. | 356/445 |
| 2010/0132079 | A1* | 5/2010 | Gerton | 850/38 |

OTHER PUBLICATIONS

C. Durkan and I.V. Shvets, "Reflection Mode Scanning Near-Field Optical Microscopy: Influence of Sample Type, Tip Shape, and Polarization of Light", J. Appl. Phys 83 (1), Feb. 1, 1998.*
Durkan et al., "Reflection-mode Scanning Near-Field Optical Microscopy: Influence of Sample Type, Tip Shape and Polarization of Light", J. Appl Phys. 83 (3) 1998, p. 1171-1176.*
"Near-field scanning optical microscopy in reflection: A study of far-field collection geometry effects", Kenneth D. Weston, Jessie A. DeAro, and Steven K. Buratto; Review of Scientific Instruments, 67 (8), Aug. 1996.
"Reflection-mode scanning near-field optical microscopy: Influence of sample type, tip shape, and polarization of light"; C. Durkan and I. V. Shvets; Journal of Applied Physics, 83 (3), Feb. 1, 1998.

* cited by examiner

*Primary Examiner* — Robert Kim
*Assistant Examiner* — David E Smith
(74) *Attorney, Agent, or Firm* — Wang Law Firm, Inc.; Li K. Wang; Stephen Hsu

(57) ABSTRACT

A near-field scanning optical microscope is disclosed. The microscope includes a lighting component, a probe and an ellipsoidal mirror. The lighting component emits a light. The probe is disposed on one side of a testing sample, and the light is focused around a probe tip to draw the near-field light out. The ellipsoidal mirror has a first focal point and a second focal point, and the first focal point and the probe tip are disposed at the corresponding positions, and the near-field light drawn out from the probe tip is scattered from the first focal point inside the ellipsoidal mirror, and reflected and passed through the second focal point.

12 Claims, 5 Drawing Sheets

NEAR-FIELD SCANNING OPTICAL MICROSCOPE

BACKGROUND OF THE INVENTION

1. Field of the Invention

The present invention discloses a near-field scanning optical microscope. The microscope includes a lighting component, a probe and an ellipsoidal mirror. The lighting component emits a light. The probe is disposed on one side of a testing sample, and the light. is focused around a probe tip to draw the near-field light out. The ellipsoidal mirror has a first focal point and a second focal point, and the first focal point and the probe tip are disposed at the corresponding positions respectively, and the near-field light drawn out from the probe tip is scattered from the first focal point inside the ellipsoidal minor, and reflected and passed through the second focal point.

2. Description of the Related Art

With reference to FIG. 1 for a conventional measuring technique by using a near-field microscope for a near-field optical scanning, FIGS. 1(a), 1(b) and 1(c) show an aperture probe. Although a smaller aperture of the probe 4 can improve the resolution, yet a light 2 passing through an aperture has a weaker power, and a near-field light 14 drawn out from the probe 4 and received by a microscope 21 is very weak and difficult to be analyzed. FIG. 1(d) shows an apertureless probe, wherein after the light 2 is projected and the near-field light 14 drawn out from the probe 4 is scattered in different directions, and the microscope 21 is provided for collecting the scattered near-field light in a far-field distance, only a very small portion of the scattered near-field light 14 is received by the microscope 21, so that the received light is very weak. Even though the light is transmitted to a photomultiplier tube for an electro-optical signal transformation and signal amplification, it is relatively difficult to analyze the near-field optical signal from the high background noise.

With reference to FIG. 2 for a conventional microscope disclosed in J. Appl. Phys. 83 (3), pages 1171~1176 by C. Durkan and I. V. Shvets in 1998, such microscope includes an optical fiber used as a probe 4, and a large-sized ellipsoidal mirror, wherein a piezoelectric ceramic tube P1 for driving the probe 4 and a piezoelectric ceramic tube P2 for driving a testing sample are included inside the ellipsoidal mirror 5, so that the overall size becomes too large. In addition, the optical fiber probe and the mirror must be coaxial with each other. The photomultiplier tube 12 is installed on a second focal point of the ellipsoidal mirror 5, and the first focal point and second focal point of the ellipsoidal mirror are disposed on both sides of the testing sample respectively. Therefore, part of a reflected light may be blocked by the piezoelectric ceramic tube P2 which drives the testing sample to lower the light receiving performance. In the meantime, the photomultiplier tube 12 is exposed directly to the outside, strong lights may damage the photomultiplier tube 12. In summation of the description above, the conventional microscope has existing drawbacks.

Obviously, the collected near-field light on the prior arts is very weak and difficult to be analyzed, and such technical problems require feasible solutions.

SUMMARY OF THE INVENTION

Therefore, it is a primary objective of the invention to provide a near-field scanning optical microscope. The microscope includes a lighting component, a probe and an ellipsoidal mirror. The lighting component emits a light. The probe is disposed on one side of a testing sample, and the light is focused around a probe tip to draw the near-field light out. The ellipsoidal mirror has a first focal point and a second focal point, and the first focal point and the probe tip are disposed at the corresponding positions, and the near-field light drawn out from the probe tip is scattered from the first focal point inside the ellipsoidal mirror, and reflected and passed through the second focal point.

Wherein, the near-field scanning optical microscope further comprises a first focusing unit and a second focusing unit. The first focusing unit is disposed between the lighting component and the testing sample, for focusing around the probe tip after the light is passed through the testing sample. The second focusing unit is provided for collecting and transmitting the near-field light through the second focal point and the second focusing unit has a focal point which is located at the second focal point.

The near-field scanning optical microscope further comprises an optical fiber, a photomultiplier tube and a lock-in amplifier. The optical fiber is provided for receiving a near-field light transmitted by the second focusing unit, and transmitting the near-field light. The photomultiplier tube is coupled to the optical fiber for receiving the near-field light transmitted by the optical fiber, converting the near-field light into an electro-optic signal and transmitting the electro-optic signal. The lock-in amplifier is coupled to the photomultiplier tube for obtaining a near-field optical signal of the testing sample after the background noise accompanying with a near-field electro-optic signal is filtered.

It is another objective of the present invention to further provide a near-field scanning optical microscope. The microscope comprises a lighting component, a probe and an ellipsoidal mirror.

The lighting component emits a light. The probe is disposed on one side of a testing sample, and the light is focused around a probe tip to draw the near-field light out. The ellipsoidal mirror has a first focal point and a second focal point, and the first focal point and the probe tip are disposed at the corresponding positions respectively, and the near-field light drawn out from the probe tip is scattered from the first focal point inside the ellipsoidal mirror, and reflected and passed through the second focal point.

Wherein, the near-field scanning optical microscope further comprises a light-division module and a third focusing unit. The light-division module is installed on a light path of the lighting component for reflecting a light and transmitting a light and a near-field light. The third focusing unit is disposed between the ellipsoidal mirror and the light-division module, for focusing and transmitting the light through the second focal point, and focusing and transmitting the near-field light through the second focal point, and the third focusing unit has a focal point which is located at the second focal point. In addition, the light transmitted through the third focusing unit and passed through the second focal point is scattered inside ellipsoidal mirror, and focused around the probe tip through a reflection, and the near-field light drawn out by the probe tip is scattered from the first focal point inside ellipsoidal mirror and passed through the second focal point through a reflection, and passed through the light-division module.

Further, the near-field scanning optical microscope further comprises an optical fiber, a photomultiplier tube and a lock-in amplifier. The optical fiber is provided for receiving the near-field light passed through the third focusing unit and the light-division module, and transmitting the near-field light. The photomultiplier tube is coupled to the optical fiber, for receiving the near-field light transmitted by the optical fiber, converting the near-field light into an electro-optic signal, and transmitting the electro-optic signal. The lock-in amplifier is coupled to the photomultiplier tube, for obtaining a near-field optical signal of the testing sample after the background noise accompanying with a near-field electro-optic signal is filtered.

In summation, the near-field scanning optical microscope of the present invention has one or more of the following advantages:

(1) The near-field scanning optical microscope of the present invention adds a highly reflective ellipsoidal mirror installed adjacent to the probe, and the position of the ellipsoidal mirror can be adjusted mechanically, so that the probe tip of the probe can be disposed on the first focal point of the ellipsoidal mirror, and the incident light is focused around the probe tip of the probe. When the probe tip of the probe is used for scanning a surface of the testing sample, the near-field light is drawn out. After the near-field light is scattered inside the ellipsoidal mirror and reflected to pass through the second focal point, the focusing solid angle can be increased significantly, such that the focusing effect can be enhanced, and the focusing efficiency can be improved significantly. In the meantime, the shielding effect caused by the profile of the testing sample may be reduced, and such shielding effect may cause an artificial near-field optical image easily.

(2) The near-field scanning optical microscope of the present invention does not come with a piezoelectric ceramic tube installed in the ellipsoidal mirror, so that the size of the ellipsoidal mirror can be reduced greatly.

(3) The near-field scanning optical microscope of the present invention has not a problem that is the light is blocked by other components (such as a piezoelectric ceramic tube used for driving a testing sample), except the probe or a probe holder may block the reflected light in the ellipsoidal mirror, and thus the light-collecting performance can be improved.

(4) The near-field scanning optical microscope of the present invention does not design the photomultiplier tube at the second focal point directly, but a second focusing unit is added to collect the scattered light and then transmit the scattered light to the optical fiber, and the optical fiber transmits the received scattered light into the photomultiplier tube, so that the light incident opening of the photomultiplier tube is not exposed to the outside directly, and a sudden damage to the photomultiplier tube can be prevented.

DETAILED DESCRIPTION OF THE PREFERRED EMBODIMENTS

Figure 1:
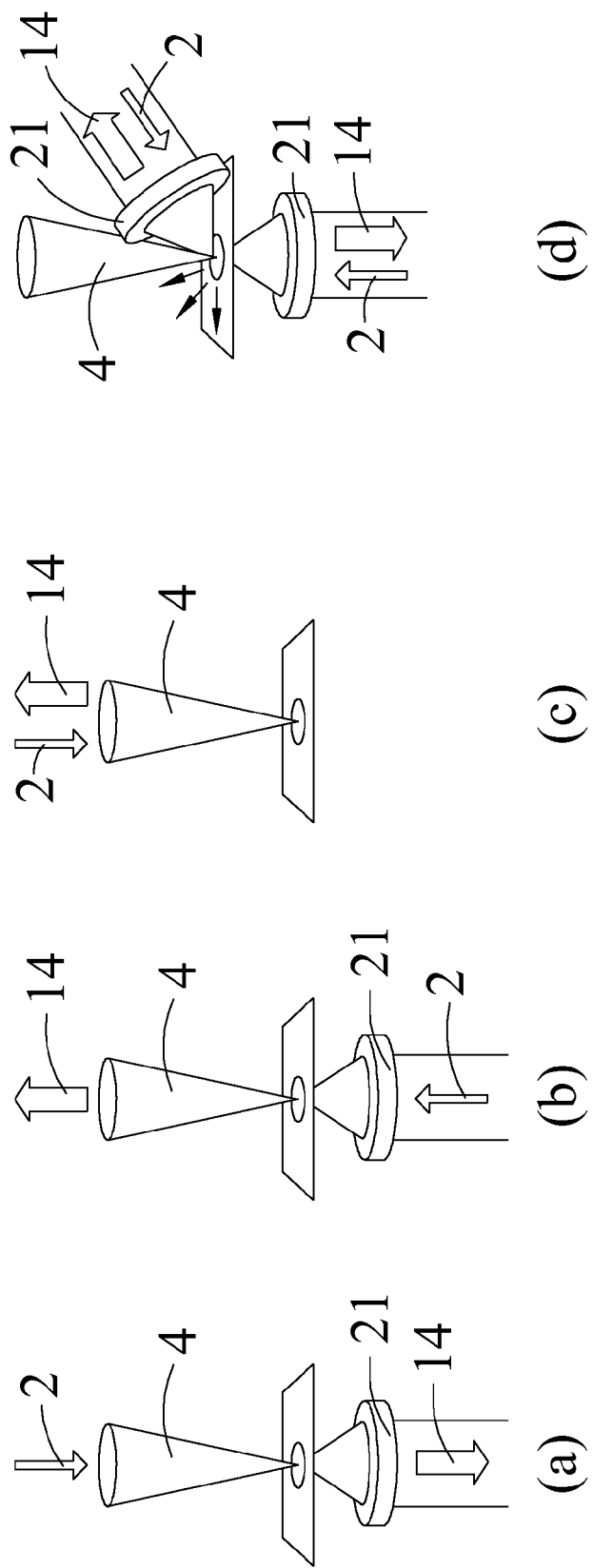
FIG. 1 is a schematic view for a measuring technique using a conventional near-field scanning optical microscope.
Figure 2:
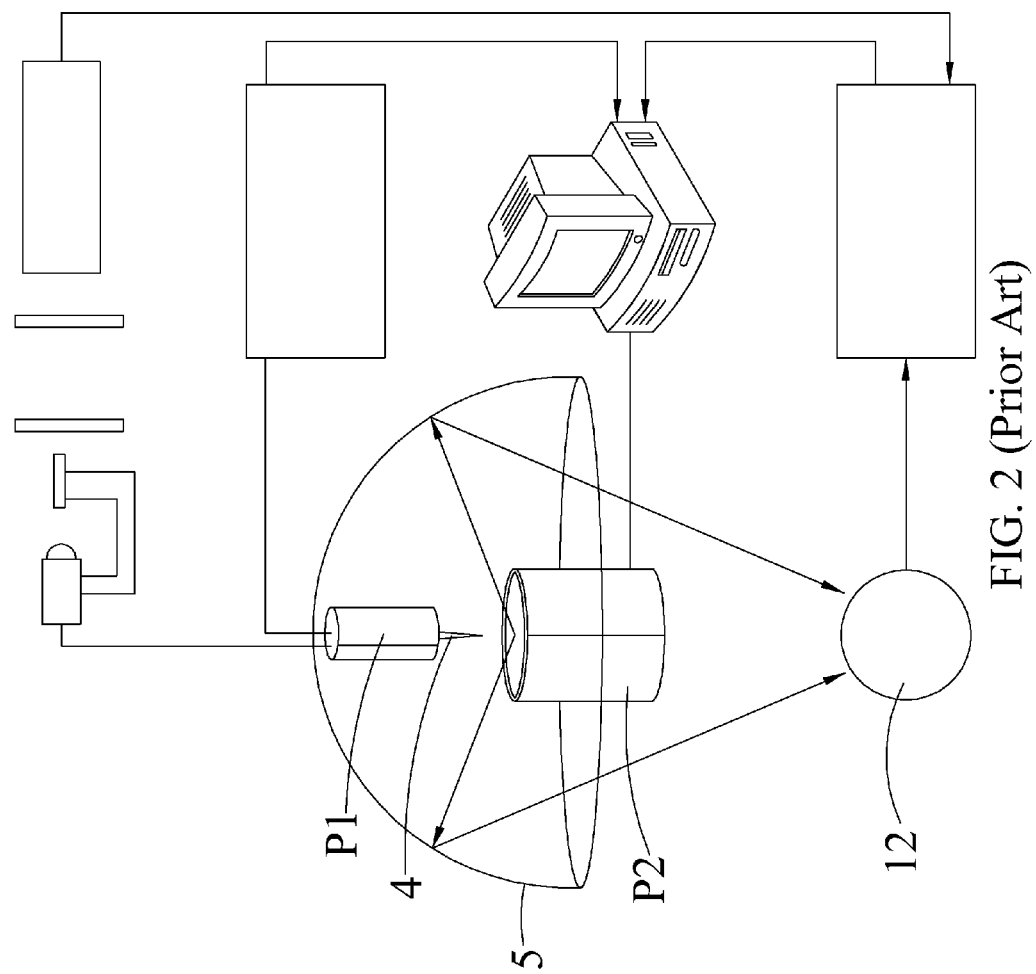
FIG. 2 is a schematic view for a measuring technique disclosed by a prior art.

The technical measurements taken by the present invention to achieve the foregoing objectives and effects will become apparent with the detailed description of preferred embodiments together with related drawings as follows. It is noteworthy to point out that same numerals are used for representing same respective elements in the drawings for the purpose of illustrating the present invention.

Figure 3:
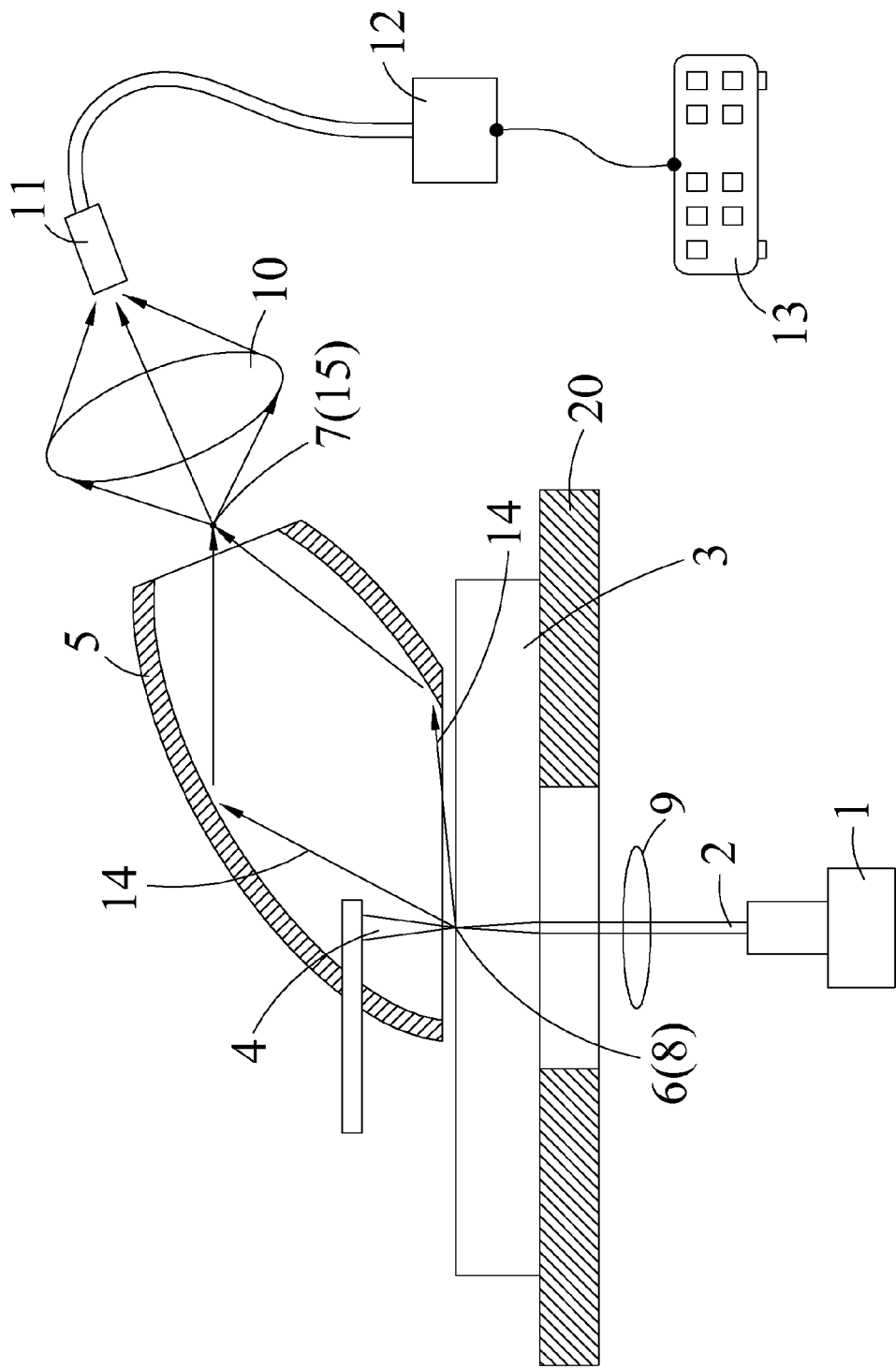
FIG. 3 is a schematic view of a near-field scanning optical microscope in accordance with a first preferred embodiment of the present invention.

With reference to FIG. 3 for a schematic view of a near-field scanning optical microscope in accordance with a first preferred embodiment of the present invention, the microscope comprises a lighting component 1, a probe 4 and an ellipsoidal mirror 5. The lighting component 1 emits a light 2. The probe 4 is disposed on one side of a testing sample 3, and the light 2 is focused around a probe tip 8 of the probe 4 to draw out a near-field light 14. The ellipsoidal mirror 5 has a first focal point 6 and a second focal point 7, and the first focal point 6 and the probe tip 8 are disposed at the corresponding positions when the near-field optical scanning is performed, and the near-field light 14 drawn out from the probe tip 8 is scattered from the first focal point 6 inside ellipsoidal mirror 5 and reflected through the second focal point 7.

In the first preferred embodiment of the present invention, the microscope has a first focusing unit 9 and a second focusing unit 10. The first focusing unit 9 is installed between the lighting component 1 and the testing sample 3, and after the focused light 2 is passed through the testing sample 3, the light 2 is focused around the probe tip 8. The second focusing unit 10 focuses and transmits the near-field light 14 through the second focal point 7, and the focal point 15 of the second focusing unit 10 is disposed at the position of the second focal point 7.

The microscope further comprises an optical fiber 11, a photomultiplier tube 12 and a lock-in amplifier 13. The optical fiber 11 is provided for receiving the near-field light 14 transmitted from the second focusing unit 10, and transmitting the near-field light 14. The photomultiplier tube 12 is coupled to the optical fiber 11 and provided for receiving the near-field light 14 transmitted from the optical fiber 11, converting the near-field light 14 into an electro-optic signal (such as a pulse current, which is not shown in the figure), and transmitting a near-field electro-optic signal. The lock-in amplifier 13 is provided for coupling the photomultiplier tube 12, and filtering out a background noise accompanying with a near-field electro-optic signal to obtain a near-field optical signal (not shown in the figure) of the testing sample (since the received optical signal also has a high background noise, in addition to the near-field light, therefore it is necessary to filter the background noise out.

Figure 4:
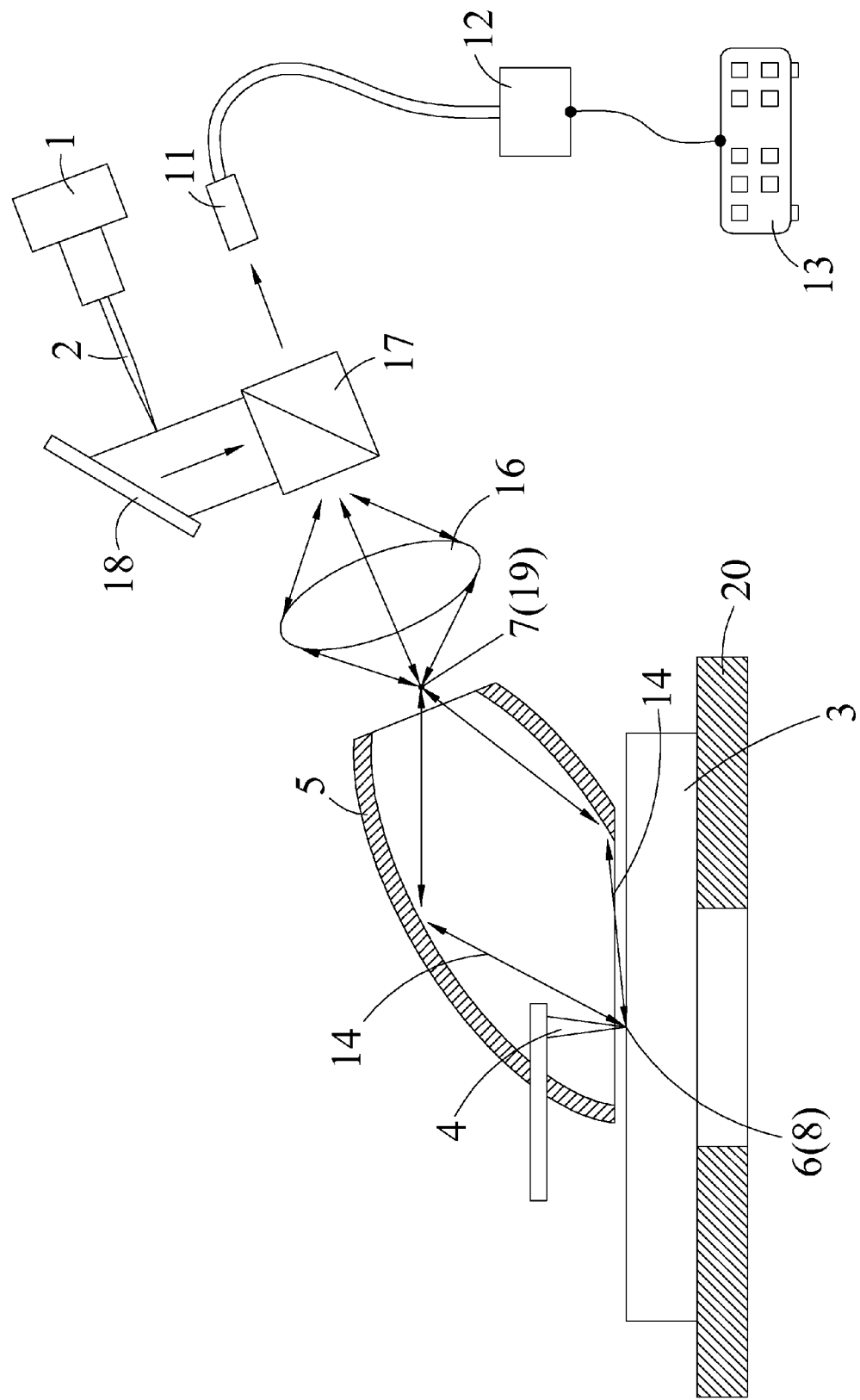
FIG. 4 is a schematic view of a near-field scanning optical microscope in accordance with a second preferred embodiment of the present invention.

With reference to FIG. 4 for a schematic view of a near-field scanning optical microscope in accordance with a second preferred embodiment of the present invention, the microscope comprises a lighting component 1, a probe 4 and an ellipsoidal mirror 5. The lighting component 1 emits a light 2. The probe 4 is disposed on one side of the testing sample 3, and the light is focused around a probe tip 8 of the probe 4 to draw out a near-field light 14. The ellipsoidal mirror 5 has a first focal point 6 and a second focal point 7, and the first focal point 6 and the probe tip 8 are disposed at the corresponding positions when the near-field optical scanning is performed, and the near-field light 14 drawn out by the probe tip 8 is scattered from the first focal point 6 inside ellipsoidal mirror 5 and passed through the second focal point 7 through a reflection.

In the second preferred embodiment of the present invention as shown in FIG. 4, the microscope further comprises a light-division module 17 and a third focusing unit 16. The light-division module 17 is installed on a light path of the lighting component 1 for reflecting the light 2 and transmitting the light 2 and the near-field light 14. The third focusing unit 16 is disposed between the ellipsoidal mirror 5 and the light-division module 17, for focusing the light 2 and transmitting the light 2 through the second focal point 7, and focusing and transmitting the near-field light 14 through the second focal point 7, and the third focusing unit has a focal point 19 at the second focal point 7. After the light 2 transmitted by the third focusing unit 16 is passed through the second focal point 7, the light 2 is scattered inside ellipsoidal mirror 5, and focused around the probe tip 8 by a reflection, and the near-field light 14 drawn out by the probe tip 8 from the first focal point 6 is scattered inside ellipsoidal mirror 5 and then reflected through the second focal point 7, and passed through the light-division module 17.

The microscope further comprises an optical fiber 11, a photomultiplier tube 12 and a lock-in amplifier 13. The optical fiber 11 is provided for receiving the near-field light 14 passed through the third focusing unit 16 and the light-division module 17, and transmitting the near-field light 14. The photomultiplier tube 12 is coupled to the optical fiber 11 for receiving the near-field light 14 transmitted by the optical fiber 11, converting the near-field light 14 into an electro-optic signal, and transmitting the electro-optic signal. The lock-in amplifier 13 is coupled to the photomultiplier tube 12 for obtaining a near-field optical signal of the testing sample after the background noise accompanying with a near-field electro-optic signal is filtered.

In FIG. 3, when the near-field optical scanning is performed, the probe 4 is approaching slowly to the testing sample 3. Due to the effect of the Van der Waals force, a nano-scale distance is maintained between the probe tip 8 and the testing sample 3, and the positions of the first focal point 6 of the ellipsoidal mirror 5 and the probe tip 8 are adjusted to the corresponding positions, and the ellipsoidal mirror 5 is mechanically linked to the body of the optical microscope (not shown in the figure), such that the relative positions of the ellipsoidal mirror 5 and the probe 4 remain unchanged. In other words, the probe tip 8 and the first focal point 6 are always maintained at the corresponding positions (The probe tip 8 of the probe 4 is used for scanning the testing sample, and the probe tip will be move up and down according to the surface profile of the testing sample, but the moving distance is very small with respect to the size of the ellipsoidal mirror, and thus the corresponding positions can be considered to be maintained, and the focal point 15 of the second focusing unit is set at the position of the second focal point 7 of the ellipsoidal mirror 5. The lighting component 1 emits a light 2 (such as a laser light). After the first focusing unit 9 focuses the light 2 and transmits the light 2 to the testing sample 3 and through the testing sample 3, the light 2 is focused around the probe tip 8. When the probe tip 8 is scanning the surface profile of the testing sample 3, the near-field light 14 drawn out by the probe tip 8 is scattered in all directions from the first focal point 6 inside the ellipsoidal mirror 5, and the scattered near-field light 14 is reflected through the second focal point 7. In other words, the scattered near-field light 14 is passed through the focal point 15 of the second focusing unit 10. After the second focusing unit 10 collects the near-field light 14 focused on the second focal point 7, and the near-field light 14 is transmitted to the optical fiber 11, and the optical fiber 11 receives the near-field light 14, the near-field light 14 is transmitted to the photomultiplier tube 12, and the photomultiplier tube 12 converts the near-field light 14 into an electro-optic signal and transmits the electro-optic signal to the lock-in amplifier 13, so as to obtain a near-field optical signal of the testing sample after the lock-in amplifier 13 filters out the background noise accompanying with the near-field electro-optic signal.

In the second preferred embodiment of the present invention as shown in FIG. 4, the probe 4 is approaching the testing sample 3 slowly for a near-field optical scanning. Due to the effect of the Van der Waals force, a nano-scale distance is maintained between the positions of the probe tip 8 and testing sample 3, and the positions of the first focal point 6 of the ellipsoidal mirror 5 and the probe tip 8 are adjusted to the corresponding positions, and the ellipsoidal mirror 5 is mechanically linked to a main body of the optical microscope, such that the relative positions of the ellipsoidal mirror 5 and probe 4 remain unchanged. In other words, the probe tip 8 and the first focal point 6 are always maintained at the corresponding positions, and the third focusing unit has a focal point 19 located at the position of the second focal point 7 of the ellipsoidal mirror 5. The lighting component 1 emits a light 2. After the light 2 is reflected from the light-division module 17 and then reflected to the third focusing unit 16, the third focusing unit 16 transmits the light 2, and the light 2 passing through the second focal point 7 is scattered inside ellipsoidal mirror 5 and focused at the first focal point 6 due to a reflection. In other words, the light 2 is focused around the probe tip 8. When the probe tip 8 is scanning a surface profile of the testing sample 3, the near-field light 14 drawn out from the probe tip 8 is scattered in different directions from the first focal point 6 inside ellipsoidal mirror 5 and reflected to focus on the position of the second focal point 7. In other words, the near-field light 14 is focused on a focal point 19 of the third focusing unit. The focused near-field light 14 transmitted by the third focusing unit 16 passes through the light-division module 17 to the optical fiber 11. After the optical fiber 11 receives the near-field light 14, the near-field light 14 is transmitted to the photomultiplier tube 12, and converted into an electro-optic signal by the photomultiplier tube 12, and the electro-optic signal is transmitted to the lock-in amplifier 13. After the lock-in amplifier 13 filters out the background noise accompanying with the near-field electro-optic signal, a near-field optical signal of the testing sample 3 is obtained.

With reference to FIGS. 3 and 4 for the first and second preferred embodiments of the present invention again, the probe 4 is an apertureless probe.

In FIG. 4, the second preferred embodiment of the present invention includes a reflecting unit 18 installed on a light path of the lighting component 1 and the light-division module 17 and provided for reflecting the light 2 to the light-division module 17.

Figure 5:
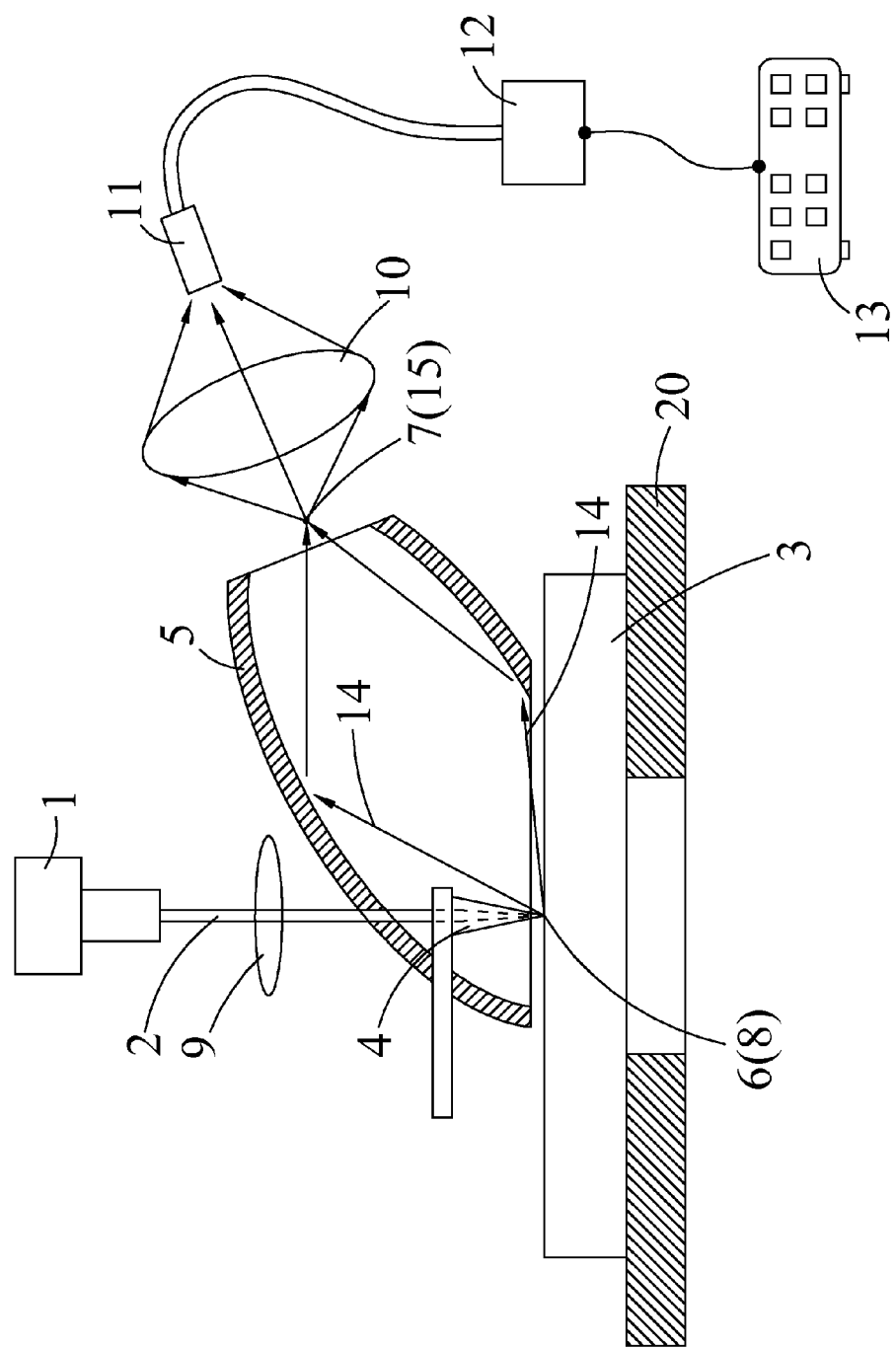
FIG. 5 is a schematic view of a near-field scanning optical microscope in accordance with a third preferred embodiment of the present invention.

With reference to FIG. 5 for a third preferred embodiment of the present invention, the probe 4 is an aperture probe. During a near-field optical scanning, the probe 4 is approaching the testing sample 3 slowly. Due to the effect of the Van der Waals force, a nano-scale distance is maintained between the positions of the probe tip 8 and testing sample 3, and the positions of the first focal point 6 of the ellipsoidal mirror 5 and the probe tip 8 are adjusted to the corresponding positions, and the ellipsoidal mirror 5 is mechanically linked to the body of the optical microscope (not shown in the figure), such that the relative positions of the ellipsoidal mirror 5 and the probe 4 remain unchanged. In other words, the probe tip 8 and the first focal point 6 are always maintained at the corresponding positions, and the focal point 15 of the second focusing unit 10 is disposed at the position of the second focal point 7 of the ellipsoidal mirror 5. The lighting component 1 emits a light 2. After the first focusing unit 9 focuses the light 2 on the top of the aperture of the probe 4, and the light 2 passes through the aperture of the probe 4, transmitted to the surface of the testing sample 3 around the probe tip 8. When the probe tip 8 is scanning the surface profile of the testing sample 3, the near-field light 14 drawn out by the probe tip 8 is scattered in different directions, and scattered from the first focal point 6 inside ellipsoidal mirror 5 and reflected to be focused on the second focal point 7. In other words, the near-field light 14 is focused on the focal point 15 of the second focusing unit. After the second focusing unit 10 collects the near-field light 14 passing through the second focal point 7, the near-field light 14 is transmitted to the optical fiber 11. After the optical fiber 11 receives the near-field light 14 and transmits the near-field light 14 to the photomultiplier tube 12, the photomultiplier tube 12 converts the near-field light 14 into the electro-optic signal, and transmits the electro-optic signal to the lock-in amplifier 13. After the lock-in amplifier 13 filters the background noise accompanying with the near-field electro-optic signal, the near-field optical signal of the testing sample 3 can be obtained.

In each of the foregoing preferred embodiments of the present invention, the light 2 is focused around the probe tip 8 and on the surface of the testing sample 3 around the probe tip 8. The best focusing effect can be achieved when the first focal point 6 and the probe tip 8 are superimposed.

In each of the foregoing preferred embodiments of the present invention, the ellipsoidal mirror 5 is cut into a shape that will not interfere with other components, and the positions of the first focal point 6 and second focal point 7 of the ellipsoidal mirror 5 are on the same side of the testing sample 3. Besides, as shown in the figures, the testing sample 3 further includes a platform 20 provided for performing a near-field optical scanning.

In summation of the description above, the near-field scanning optical microscope of the present invention does not have any component other than the probe 4 or a holder of the probe 4 inside the ellipsoidal mirror 5, and there is no issue of blocking the reflected light inside the ellipsoidal mirror 5 by other components (such as piezoelectric ceramic tubes). The light-collecting performance can be enhanced, and the size of the ellipsoidal mirror 5 can be reduced significantly. In addition, the photomultiplier tube 12 is not installed at the position of the second focal point 7 directly, but a second focusing unit 10 is added for collecting the scattered light, and transmitting the scattered light to the optical fiber 11, and the optical fiber 11 transmits the received scattered light into the photomultiplier tube 12, so that a light incident opening of the photomultiplier tube 12 is not exposed to the outside directly, and a sudden damage of the photomultiplier tube 12 can be prevented.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A near-field scanning optical microscope, comprising:
    a lighting component, provided for emitting a light;
    a probe, disposed on a testing sample, and the light being focused around a probe tip of the probe to draw the near-field light out; and
    an ellipsoidal mirror, having a first focal point and a second focal point, and the first focal point and the probe tip being disposed at corresponding positions, and the near-field light drawn out from the probe tip being scattered from the first focal point inside the ellipsoidal mirror, and reflected and passing through the second focal point, wherein the ellipsoidal mirror is a hollow ellipsoidal sphere having two open ends such that the near-field is emitted into the hollow ellipsoidal sphere through an open end or another separate opening and reflected outward the hollow ellipsoidal sphere through an open end.

2. The near-field scanning optical microscope of claim 1, further comprising:
    a first focusing unit, installed between the lighting component and the testing sample, for focusing the light around the probe tip after focusing and passing the light through the testing sample; and
    a second focusing unit, provided for collecting the near-field light passing through the second focal point and transmitting the collected near-field light, and the second focusing unit having a focal point located at the second focal point.

3. The near-field scanning optical microscope of claim 2, further comprising:
    an optical fiber, for receiving the near-field light transmitted from the second focusing unit, and transmitting the near-field light;
    a photomultiplier tube, coupled to the optical fiber, for receiving the near-field light transmitted from the optical fiber, and converting the near-field light into an electro-optic signal, and transmitting the electro-optic signal; and
    a lock-in amplifier, coupled to the photomultiplier tube, provided for obtaining a near-field optical signal of the testing sample, after filtering a background noise accompanying with the electro-optic signal.

4. The near-field scanning optical microscope of claim 1, further comprising:
    a light-division module, installed on a light path of the lighting component, for reflecting the light, and transmitting the light and the near-field light; and
    a focusing unit, installed between the ellipsoidal mirror and the light-division module, and provided for focusing the light and transmitting the light through the second focal point, and collecting the near-field light passing through the second focal point, and the focusing unit having a focal point located at the second focal point;
    thereby, after the light transmitted from the third focusing unit passes through the second focal point, the light is scattered inside the ellipsoidal mirror and focused around the probe tip due to a reflection, and the near-field light drawn out by the probe tip at the first focal point is scattered inside the ellipsoidal mirror, and the near-field light is reflected through the second focal point and then passes through the light-division module.

5. The near-field scanning optical microscope of claim 4, further comprising:
    an optical fiber, for receiving the near-field light passing through the focusing unit and the light-division module, and transmitting the near-field light;
    a photomultiplier tube, coupled to the optical fiber, for receiving the near-field light transmitted by the optical fiber, and converting the near-field light into an electro-optic signal, and transmitting the electro-optic signal; and
    a lock-in amplifier, coupled to the photomultiplier tube, for obtaining a near-field optical signal of the testing sample after filtering a background noise accompanying with the electro-optic signal.

6. The near-field scanning optical microscope of claim 1, further comprising a platform for disposing the testing sample.

7. The near-field scanning optical microscope of claim 1, wherein the probe is an apertureless probe.

8. The near-field scanning optical microscope of claim 1, wherein the ellipsoidal mirror is cut into a shape which has no interference with other components.

9. The near-field scanning optical microscope of claim 1, wherein the first focal point and the second focal point are disposed on the same side of the testing sample.

10. The near-field scanning optical microscope of claim 1, wherein the light is focused around the probe tip and on a surface of the testing sample around the probe tip.

11. The near-field scanning optical microscope of claim 1, wherein the first focal point and the probe tip are superimposed.

12. The near-field scanning optical microscope of claim 1, wherein the probe is an aperture probe.

* * * * *